(12) United States Patent
Hufferd

(10) Patent No.: US 9,106,641 B1
(45) Date of Patent: *Aug. 11, 2015

(54) DIRECT MODE ADAPTER BASED SHORTCUT FOR FCOE DATA TRANSFER

(71) Applicant: RPX CORPORATION, San Francisco, CA (US)

(72) Inventor: John L. Hufferd, San Jose, CA (US)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,628

(22) Filed: Sep. 19, 2014

Related U.S. Application Data

(63) Continuation of application No. 14/180,156, filed on Feb. 13, 2014, now Pat. No. 8,843,659, which is a continuation of application No. 12/959,371, filed on Dec. 3, 2010, now Pat. No. 8,713,162.

(51) Int. Cl.
*H04L 29/06* (2006.01)

(52) U.S. Cl.
CPC ............... *H04L 69/08* (2013.01); *H04L 69/26* (2013.01)

(58) Field of Classification Search
None
See application file for complete search history.

(56) References Cited

U.S. PATENT DOCUMENTS

| | | | |
|---|---|---|---|
| 2004/0148380 A1* | 7/2004 | Meyer et al. | 709/223 |
| 2009/0245791 A1* | 10/2009 | Thaler et al. | 398/45 |
| 2011/0032933 A1* | 2/2011 | Eisenhauer et al. | 370/389 |

* cited by examiner

*Primary Examiner* — Hassan Phillips
*Assistant Examiner* — Omeed D Rahgozar
(74) *Attorney, Agent, or Firm* — Howison & Arnott, LLP

(57) ABSTRACT

This invention permits all FCoE (Fiber Channel over Ethernet) frames to be transferred from one FCoE network adapter to another without having to traverse through a Fiber Channel Forwarder (FCF) device. After the FCF is determined not to be present, a logical End-To-End connection is established between Peer FCoE Adapters. This invention permits an FCoE message originating at an FCoE network adapter to be sent to an FCoE receiving adapter across "Ethernet" links and switches, or via a single "Ethernet" link (Point-To-Point) but without having to pass through FCF devices.

3 Claims, 11 Drawing Sheets

A Direct Mode FCoE Network Configuration Example

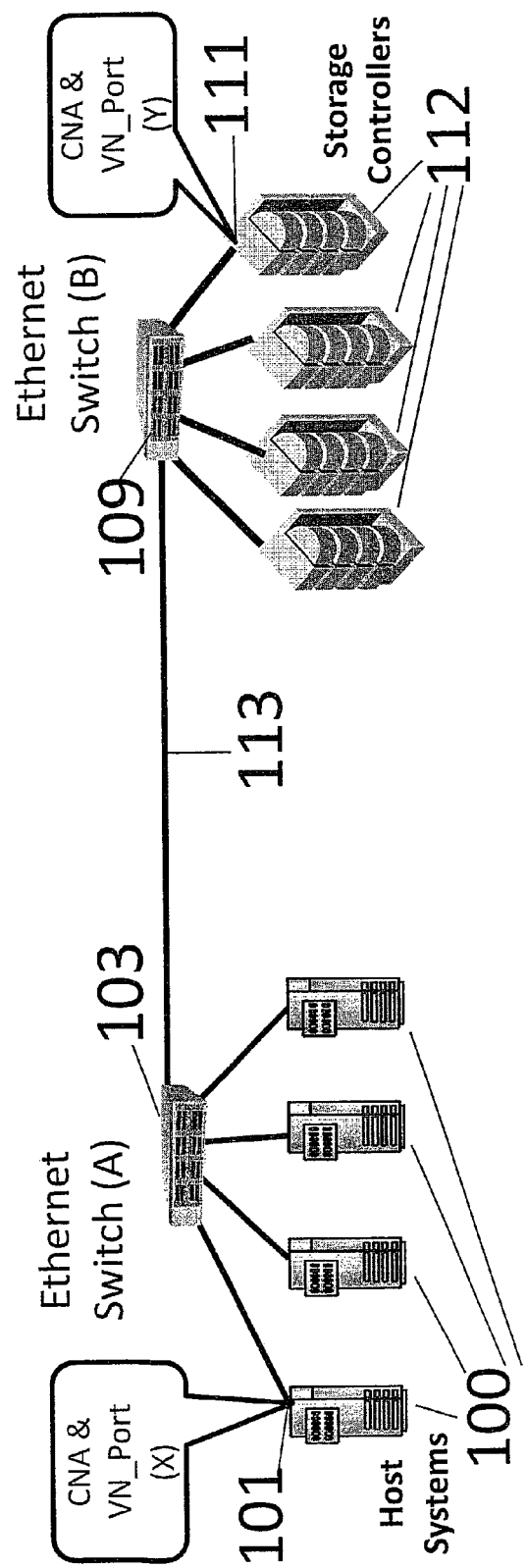
Fig. 1a – A Direct Mode FCoE Network Configuration Example

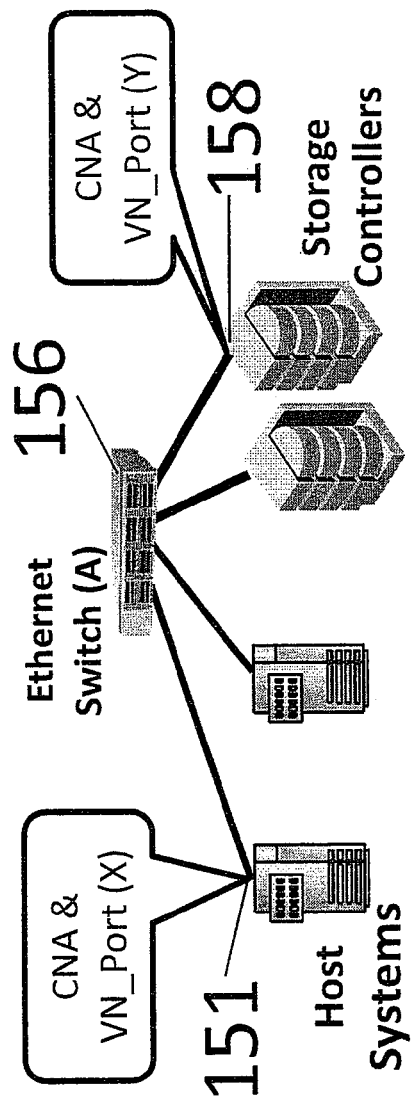
Fig. 1b – A Direct Mode Network Configuration Example

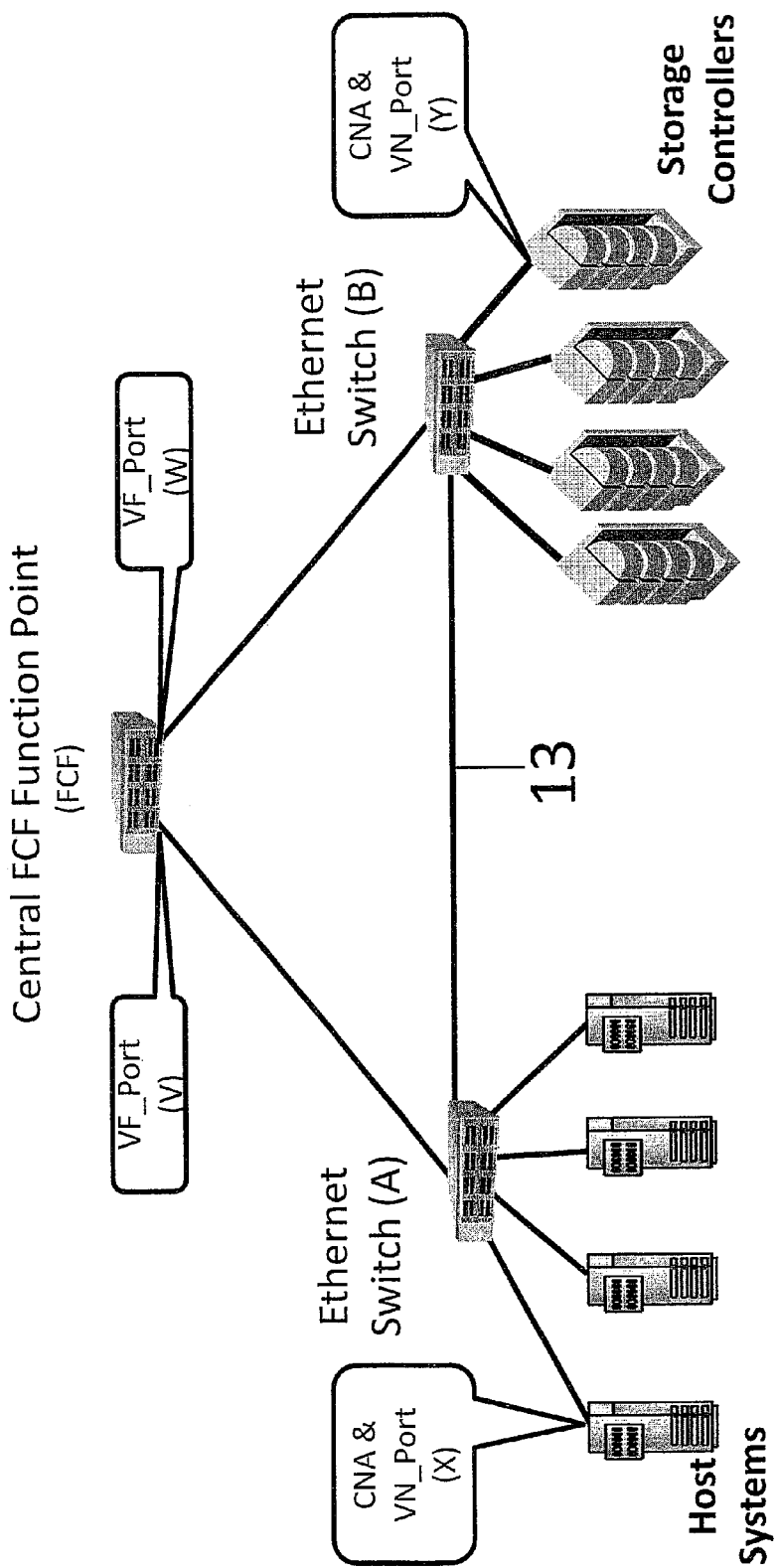
Fig. 1c – A FCoE Network Configuration Example

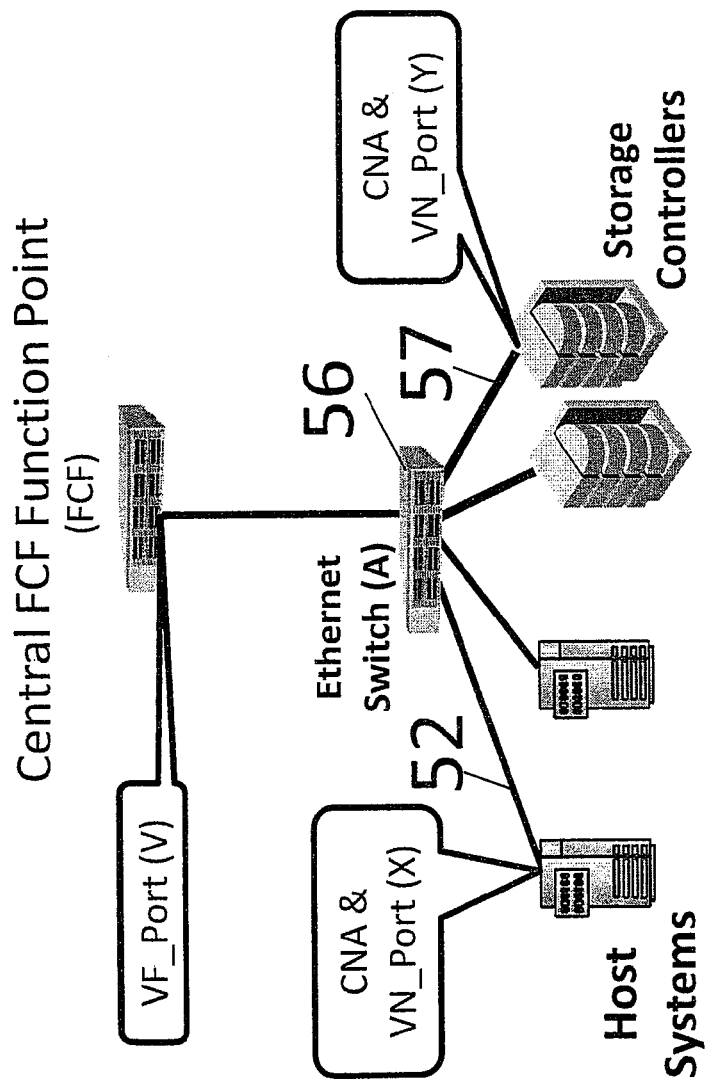
Fig. 1d – A FCoE Network Configuration Example

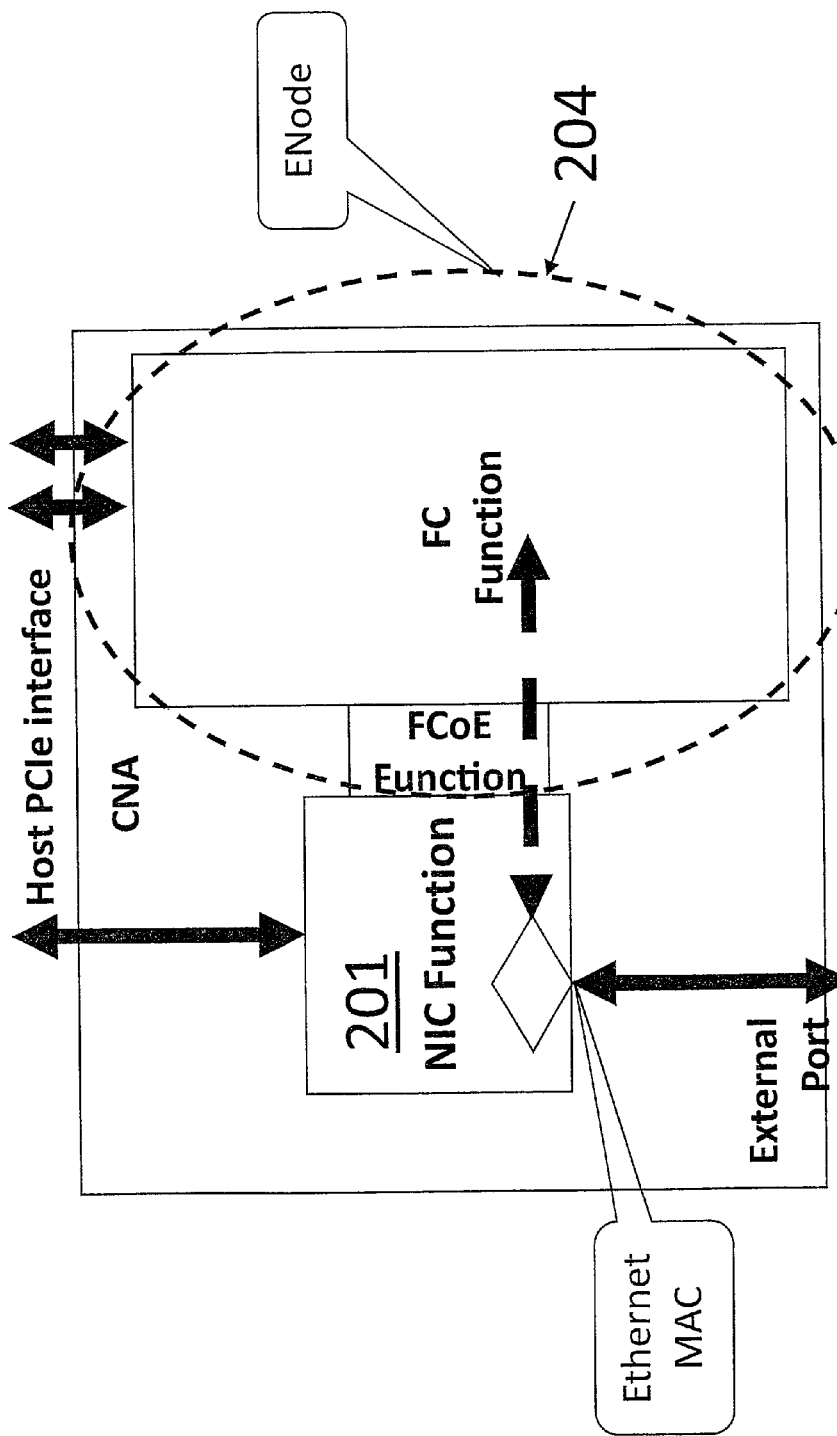
Fig. 2 – Overview of an FCoE Converged Network Adapter (CNA)

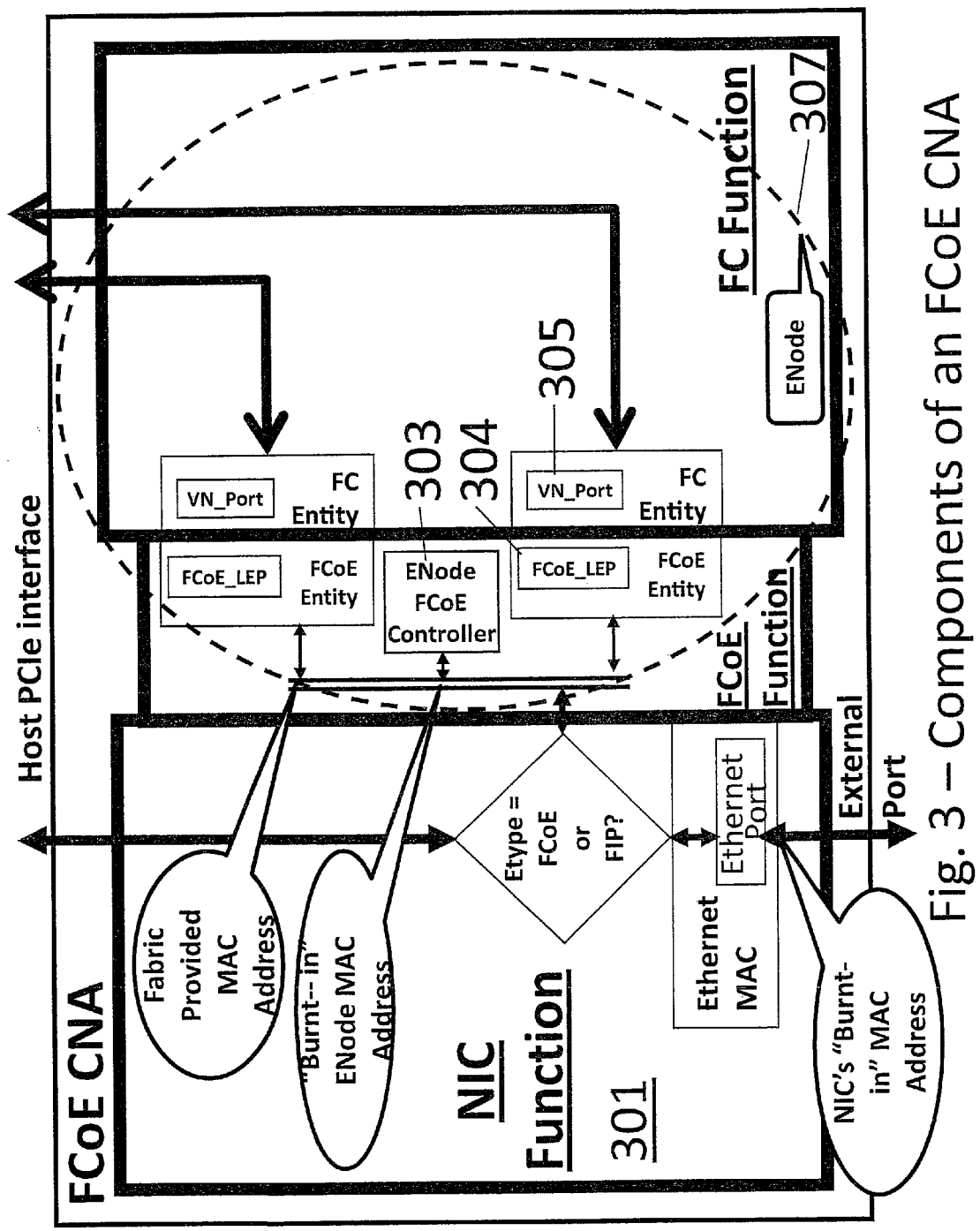
Fig. 3 – Components of an FCoE CNA

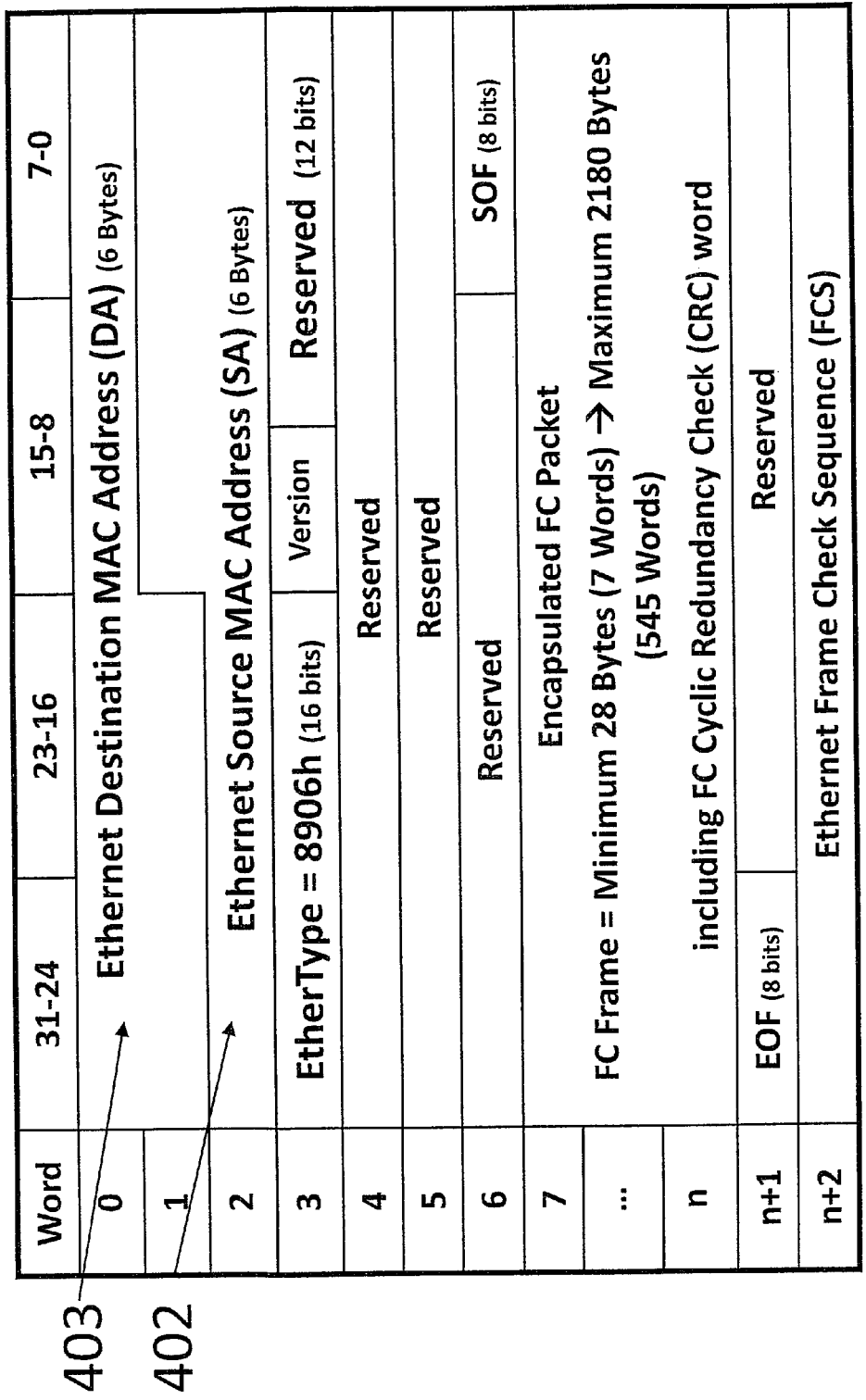
Fig. 4 FC's Encapsulation in Ethernet (an FCoE Frame)

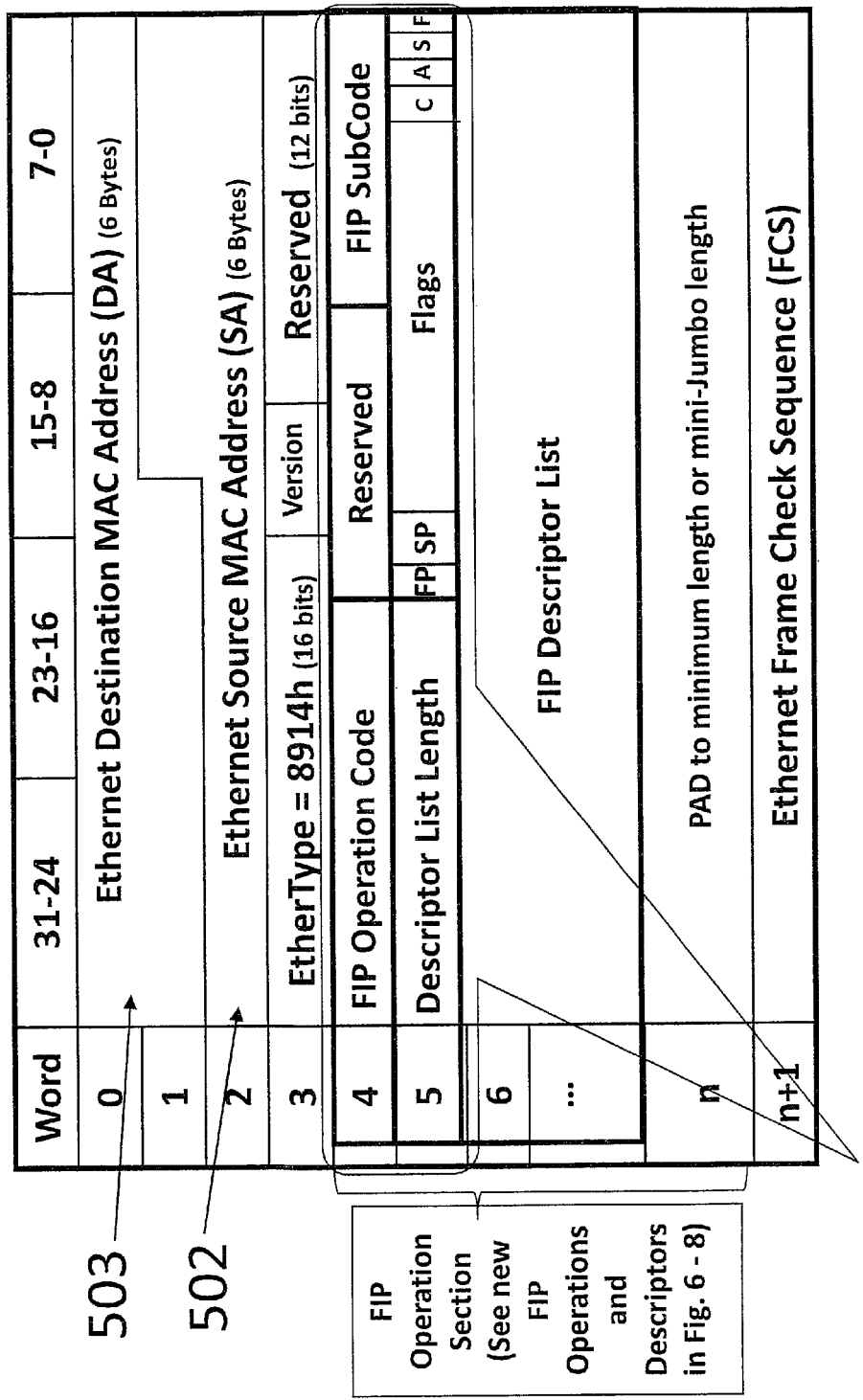
Fig. 5 FIP Message Encapsulation in Ethernet (aka FIP Frame)

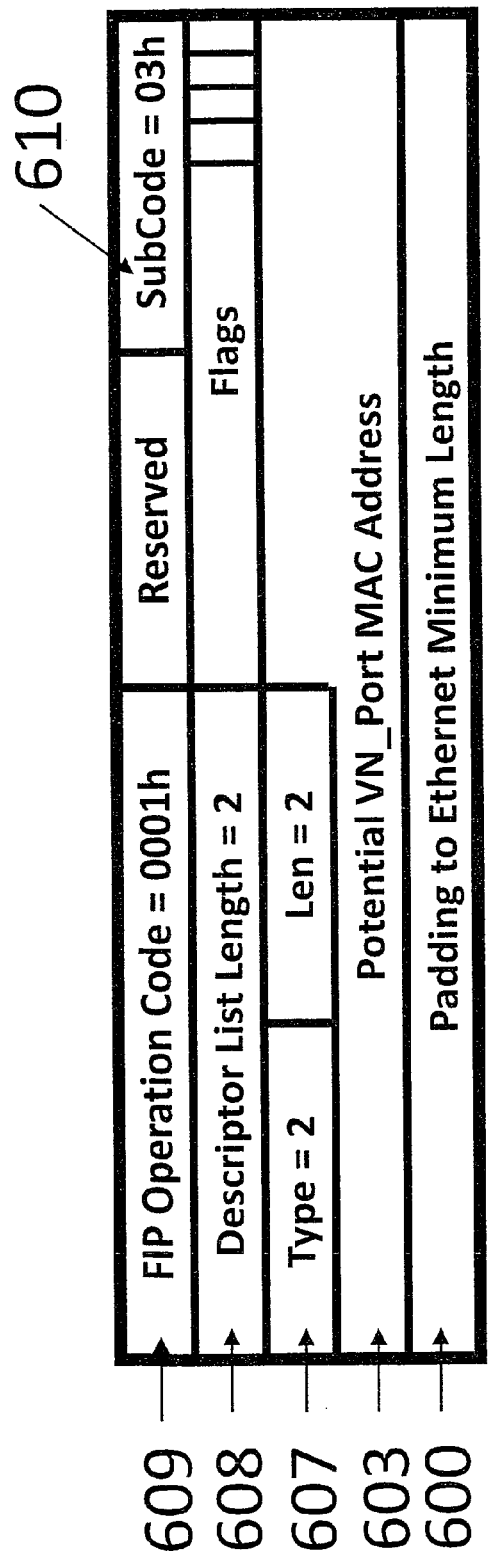
Fig. 6 The Operation Section of the VN_Port MAC Address Verification Solicitation FIP Message

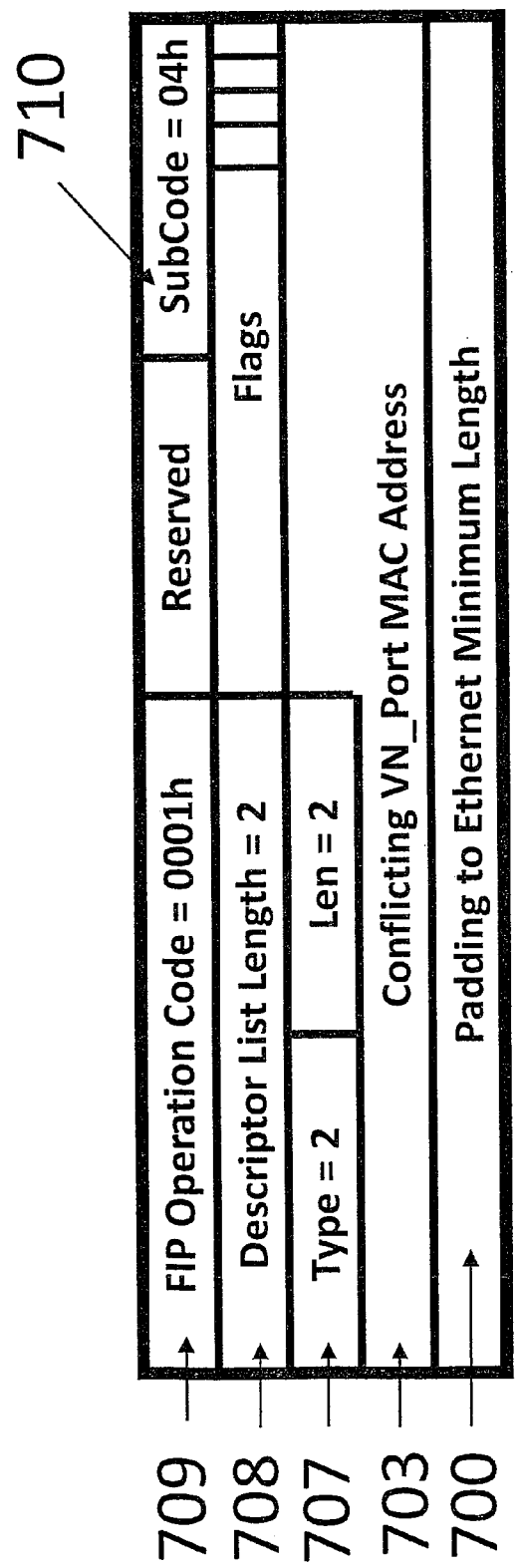
Fig. 7 Operation Section of the VN_Port MAC Address Conflict Response FIP Message

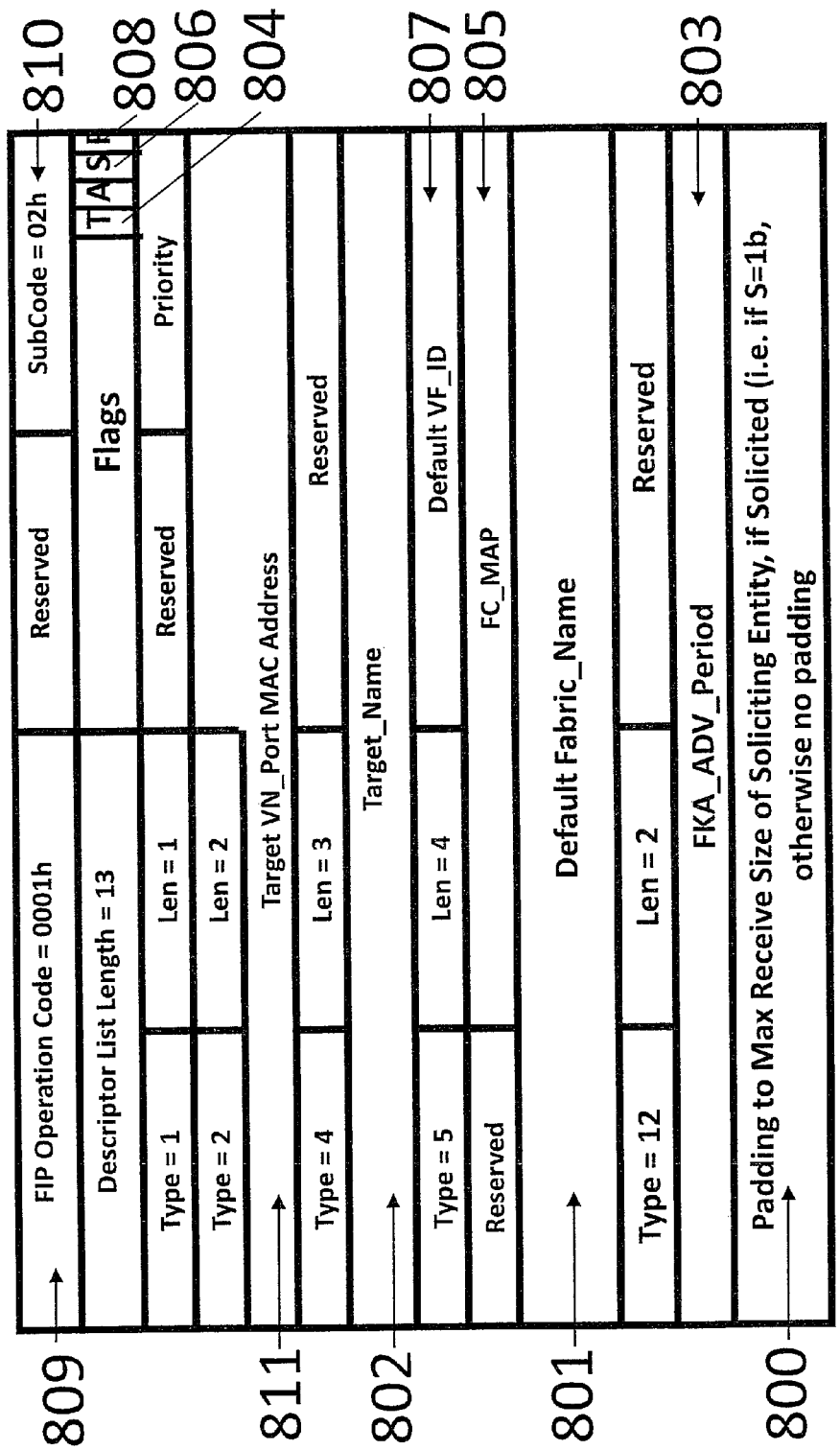
Fig. 8 Operation Section of the Target VN_Port Advertisement FIP Message

DIRECT MODE ADAPTER BASED SHORTCUT FOR FCOE DATA TRANSFER

CROSS-REFERENCE TO RELATED APPLICATIONS

This application is a continuation of U.S. patent application Ser. No. 14/180,156, filed Feb. 13, 2014, now U.S. Pat. No. 8,843,659, which is a continuation of U.S. patent application Ser. No. 12/959,371, filed Dec. 3, 2010, (which claims priority to U.S. Provisional Patent Application No. 61/267,421, filed Dec. 7, 2009), now U.S. Pat. No. 8,713,162.

FIELD OF INVENTION

This invention relates to methods, systems, and apparatus for transferring computer messages.

BACKGROUND OF THE INVENTION

A data transmission technology exists which is called "Fibre Channel" (FC), and this technology has been around since the early 1990s. This FC technology is made up of both electrical specifications and a protocol specification called FCP (Fibre Channel Protocol) which define the packaging of messages that control the operation and encapsulate commands, data, responses, and other messages. A technical committee called T11, which is a committee within INCITS (the Inter National Committee for Information Technology Standards), is responsible for all the international standards dealing with Fibre Channel. INCITS is accredited by, and operates under rules approved by, the American National Standards Institute (ANSI). In 2009 the T11 technical committee defined a new standard (accepted by INCITS in 2010) called FCoE (Fibre Channel over Ethernet). The primary reference document for the FCoE standard can be found at the T11 website and is known as "FIBRE CHANNEL BACKBONE 5 (FC-BB-5) rev. 2.00 (document T11/09-056v5). This FC-BB-5 standard has been approved by ANSI and published on May 2010 as INCITS 462:2010. This FC-BB-5 standard defined how Fibre Channel Protocols (FCP) could flow over a special Ethernet Network which is defined as a "Lossless Ethernet" (but called herein just "Ethernet"). The Ethernet frames that carried the FCP were called FCoE frames. In order to handle these new kinds of frames and protocols, a structure was defined for a new type of device called a Fibre Channel Forwarder (FCF). This device (FCF) was a combination of a Fibre Channel Switch and Ethernet ports (sometimes including an Ethernet switch). The FCF was able to convert FCoE frames to traditional FC frames and vice versa. There was also a structure defined for a new type of device called a Converged Network Adapter (CNA). This device was a combination of a normal Ethernet Network Adapter and a Fibre Channel Adapter.

The FCF was required in order to establish logical connections between the end point devices (e.g. systems and storage controllers). The FCF was also required in order to pass messages between the end point devices. That is, the FCF required messages (commands, data, responses, etc.) to flow through the FC parts of the FCF.

There is a capability within FC that permits ports to directly connect to each other and bypass the FC Switch itself. This capability was used as part of FC Loop configurations, and for a Switchless connection between the ports (i.e. Point-to-point or direct FC wire interconnects).

Within FCP are two important concepts for this discussion, one is the establishment of the Logical/Physical link from the System Adapter to the FC Switch (or directly wired to the peer System Adapter), and the other is the establishment of the logical End-To-End connection/path from one adapter through the FC Switch to the other adapter (or directly via a FC wire to the peer Adapter). The (Logical) link establishment is accomplished in FC Switched Fabrics by each endpoint "Logging" into a FC Switch and making their identities known to the switch (and other devices). In a direct wired connection one of FC Adapters Logs directly into the other. These logins are done with a set of protocols known as the FLOGI (Fabric Login) and FLOGI LS_ACC (Fabric Login Link Services Accept called herein, FLOGI ACC) which are used in a process that establishes a logical link to the FC Switch or directly to a peer FC Adapter. The End-To-End logical connection/path is established via a set of protocols known as PLOGI (Port Login) and PLOGI LS_ACC (Port Login Link Services Accept called herein, PLOGI ACC). (The PLOGI process is required even if the End Points are directly connected.) Sometime after the completion of these login processes, the Upper Layer Protocol (ULP) can send its messages (commands, data, responses, etc.). An example of an ULP is SCSI (Small Computer System Interconnect) which is a storage Input/output (I/O) protocol and is one of the traditional ULPs carried by Fibre Channel.

The actual FC protocol which defines the connection requests and the accepting protocol for connection establishment directly between End nodes is defined in the T11 Draft Standard which can be found at the T11 Web site www.t11.org and is known as Fibre Channel Link Services-2 (FC-LS-2) Rev 2.12 (T11/09-260v2), Project 2103-D. And that draft standard is included herein by reference. This Invention specification refers to that draft standard as the "FC-LS-2" draft Standard (or just as FC-LS-2).

The FCoE FC-BB-5 standard, as mentioned above, has defined how the Fibre Channel Protocol (FCP) can operate within an Ethernet environment; as part of this new environment the Ethernet enabled FC Switch is called an FCF (Fibre Channel Forwarder) and the End Adapters are called CNAs (Converged Network Adapters). They are called CNAs because they can not only handle the normal Ethernet Frames (that carry messages for normal communication), but also carry FCP messages. Therefore, a single adapter and port could carry both the FCP protocol (in FCoE frames) and other Ethernet protocols, which are all converged into a single adapter called a CNA. (Refer to FIG. 2—Overview of an FCoE Converged Network Adapter.)

In a Real FC network of devices, the Adapter is often called the ENode (for End Node) and the element within the ENode that controls the connection point is called the N_Port (for eNd node Port), and the connection point in the FC Switch is called the F_Port (for Fabric Port). Since within FCoE the physical Ethernet link could be carrying many different logical links, the links between the CNAs and the FCFs are called Virtual links; the N_Ports and F_Port functions are called VN_Ports and VF_Ports (where the V stands for Virtual).

In FCoE the ENode (see FIGS. 2-204 and FIGS. 3-307) is the entire FCoE/FC part of the adapter that does not include the Ethernet NIC (Refer to FIGS. 2-201 and FIG. 3-301). (Note: This invention specification will refer to the combination of the FCoE LEP (Link End Point) (304 in FIG. 3) and the corresponding VN Port (305 in FIG. 3) as just the VN Port.)

In order for FC packets to flow on an Ethernet network they must be encapsulated in Ethernet frames. That means the source and destination 48 bit Ethernet media access control (MAC) address of the ports have to be known and placed into the address fields of the Ethernet Frames. These encapsulated FC packets are known as FCoE Frames (Refer to FIG.

4—FC's Encapsulation in Ethernet which includes the Source MAC Address—402, and the Destination MAC Address—403). Therefore, in an FCF environment, the FCF must advertise its own MAC addresses to ENodes and also dynamically build & assign a MAC address (for the VN_Port) that is made up of a FC port identifier known as the "N_Port_ID", and an FCoE identifier known as an FC-MAP. (Refer to FC-BB-5 Standard for the detail layout of the FC-MAP value.) Both of these identifiers are 24 bits long and when concatenated together make up the assigned 48 bit MAC address of the VN_Port. This is called a Fabric Provided MAC Address (FPMA).

As part of the FC-BB-5 FCoE specification is a sub-protocol called FIP (FCoE Initiation Protocol). (Refer to FIG. 5 FIP Message Encapsulation in Ethernet, which includes the Source MAC Address—502, and the Destination MAC Address—503.) FIP was created in order to discover the environment, and devices that are part of an FCoE Fabric.

It is important to understand that even though the FC standards did permit ENodes to connect directly to other ENodes, the FCoE standard (FC-BB-5) did not permit it (neither via a point to point Ethernet wire, nor via an Ethernet switched network that did not include an FCF). (Refer to FIG. 1c; and note the Link 13 that cannot be used by the FC-BB-5 standardized FCoE. Also refer to FIG. 1d and note that the internal path within the Ethernet Switch (A) 56, from Link 52 to Link 57, can also not be used by devices which followed the FC-BB-5 standard for FCoE.)

SUMMARY OF THE INVENTION

The FC-BB-5 requirement for FCoE frames to traverse the FCF device added additional path length and additional latency which might otherwise be avoided if there was a more direct path through either point to point wires or Ethernet switches. There was a need therefore for new processes, procedures, and protocol elements which would permit the creating of a "Shortcut" path which could bypass the FCF such that FCoE messages could travel from End device adapter to End device adapter without having to go through the FCF. (Refer to FIG. 1a and FIG. 1b.) In other words there was a need for an End device adapter to communicate with other End device adapters across an Ethernet network without the FCF (or FC Switch) involvement, as is possible with Real FC End device adapters. Since protocols used by FCoE End device adapters operate on an Ethernet network, this invention extends the FC direct connection concept to FCoE and permits two FCoE type device adapter (CNA) ports to connect directly to each other, via an Ethernet network switch (or a single Ethernet wire), but without a FCF type device being involved.

Since an Ethernet adapter cannot (in general) tell if it is separated from a remote Ethernet adapter by an Ethernet switch or a single Ethernet wire, when ever this invention specification talks about direct End Node communication/interconnection it should be understood that it implies use of Ethernet switches or a single Ethernet wire to physically connect the End Nodes. And whenever this specification talks about an Ethernet network it also implies (depending on context) either a single Ethernet wire or a network that includes one or more Ethernet switches.

This invention brings together the FC capabilities of direct interconnection with the Ethernet network. It will therefore bypass (or Shortcut around) any requirement for an FCF to be involved. This new capability is called (herein) the "Direct Mode" (or "Direct Mode Adapter Based Shortcut" or "Direct Mode Shortcut").

In Direct Mode the connection between the CNAs through the Ethernet network is also called a Virtual Link (as is the link between CNAs and an FCF, described above in the background).

Depending on context, the term CNA (herein) will often imply the ENode or the ENode/VN_Port. However, depending on the context it can also mean the combination ENode and the Ethernet Adapter. The term "peer" will refer, in general, to an object on a specific side of a connection (such as the Local CNA peer, or remote VN_Port peer, etc.), and the term "peers" will refer, in general, to objects that are (or could be) on opposite sides of an FCoE logical End-to-End connection (direct mode or otherwise). Also the term "Ethernet network", herein, refers to an Ethernet network that connects CNAs with only with a single wire or with what is known as Layer 2 devices (such as Ethernet switches) and has no means to route messages to otherwise separate Ethernet networks.

In the FC Storage related protocol, the Host Computer System (or other device) that needs to read or write data is called an Initiator, and the Storage System (aka Storage Controller) is called the Target. Those terms will also be used in this specification of the invention.

This invention permits an FCoE environment to have FCoE processes and protocols directly between peer CNAs (ENodes) when they are connected together via a single Ethernet wire or via an Ethernet switch. That is, the goal of this invention is to permit the commands, data, responses, control messages, etc. to flow, directly between the peer CNAs (VN_Port to VN_Port), "Shortcutting" around the requirement for FCFs to be involved. This idea of a Direct Mode FCoE process will only work when the peer CNAs are enabled/configured for this new "Direct Mode Adapter Shortcut" feature and are located within the same Ethernet network. If it is necessary for messages to flow between two or more networks, then real FC Switch functions are needed and a fully functional FCF will be required to interconnect the networks and handle the messages, as is the case before this invention.

This invention specification does include some advantageous example layouts of some new FIP type messages, however, the content and layout of these new (example) FIP type messages can be altered and (if they contain the key information) still have the desired effect on the actions described in this invention. Further, it is possible to use even a different Ethernet Type, and still have the desired effect. Two of these new FIP messages are intended to be used to insure that a generated FPMA formatted MAC address is not duplicated in the network. There are other techniques that can be used which may require other protocols or processes to ensure that the generated FPMA MAC addresses are unique, and those protocols/processes should be considered compatible with this invention. Even though this invention specification talks about Initiators issuing some FIP or FCoE messages, and a target responding, this terminology is usually used only for process clarity, since it is also possible, in many cases, that a target may be the initiator of a FIP message, while the Initiator can be the responder to the FIP message. And such an interaction should be considered compatible with this invention. This also means that when Multicast messages are sent (for example) to "All-Initiator-MACs" or "All-Target-MACs" it should therefore be read as being sent to All ENode MACs that are enabled/configured for Direct Mode Shortcut operations.

In an environment without an FCF, the ENodes must advertise their existence and MAC addresses to each other. Since there is no FCF, the ENodes must dynamically create their own MAC address with a process which will provide a unique MAC address similar to the FCF created FPMA, but using a default or administrator set FC-MAP. (Included in this MAC address creation process is a technique for insuring that the generated MAC address is unique within the subject Ethernet network.)

In this "Direct Mode Shortcut" invention, the VN_Port of one Direct Mode Shortcut enabled CNA can send Fibre Channel Protocol message (within an FCoE frames) directly to a VN_Port of another Direct Mode Shortcut enabled CNA after the End-to-End logical connection between the VN_Port peers has been fully established (after successful completion of the PLOGI/PLOGI ACC process).

The high level steps in the main process of the advantageous embodiment of this invention are as follows:
1. The CNA peers will perform FCoE (FC-BB-5) Discovery processes to determine if any FCFs are available for connections. If no FCFs are found, or if specified by an administrator, the following steps will be performed.
2. The ENodes in the Network will create (generate) MAC addresses for each VN_Port that they intend to support. They will either use a local or remote generation technique that guaranties no duplicates in the network, or they will validate that the generated MAC address is unique by testing it by sending a test message, and waiting to see if a Conflict Response Message is returned, if so, then the MAC address generation process will repeat.
3. The ENodes (for example: Initiators) will send out FCoE FIP Discovery Solicitations that are Multicast to (for example) "All-Target-MACs". Targets which receive the Solicitation should respond with a Unicast Advertisement FIP message back to the Soliciting ENode (e.g. Initiator). This Response (Advertisement) FIP Message should (in the preferred implementation) have the general format of the FCoE FCF FIP Advertisement (Refer to FC-BB-5). However, it will also contain an indication that this Response (Advertisement) is being sent from an ENode (e.g. Target) instead of from an FCF. This interchange gives descriptive information about the Target to the Initiator (and vice versa) which will permit the Initiator to chose between all the returned responses and select the Targets to which it wants to create a Virtual Link.
4. The Initiators will issue the FCoE FLOGI FIP Messages to selected Targets and the Targets should respond with FCoE FLOGI ACC. Upon the receipt of the FCoE FLOGI ACC the Virtual Link can be assumed to be established, and the VN_Ports can exchange FCoE PLOGI/PLOGI ACC, etc. and then function as if they are in a Point-to-Point connection.
5. ULP messages (e.g. commands, data, responses, etc.) will then be able to flow directly between the VN_Port Peers.
6. The ENode controller (for example the Target ENode) will periodically advertise its available VN_Ports by sending Multicast Advertisements to (for example) "All-Initiator-MACs" starting from the time it discovers that it is operating in Direct Mode (and obtains its VN_Port MAC addresses).
7. All ENode controllers will periodically send (e.g. multicast) Keep Alive FIP Messages, on behalf of its established VN_Ports (if any), to peer VN_Ports.
8. End-To-End logical connections may be terminated via the normal FCoE FC-BB-5 Standardized processes (e.g. Fabric Logoff—LOGO and LOGO LS_ACC—Logoff Accept). And then no messages should be sent or accepted between those VN_Port Peers.

BRIEF DESCRIPTION OF THE DRAWINGS

In the drawings, which form a part of this specification:
FIG. 1a is a topology configuration example of an FCoE Network without an FCF. It shows Host Systems and their connections to Storage Controllers through an Ethernet Network made up of Ethernet Switches. The Ethernet Links physically connect these various components.

FIG. 1b is another topology configuration example of an FCoE Network without an FCF. It shows Host Systems and their connections to Storage Controllers through a single Ethernet Switch. The Ethernet Links physically connect these various components.

FIG. 1c is a topology configuration example of an FCoE Network (with an FCF). It shows Host Systems and their connections to Storage Controllers through an Ethernet Network made up of Ethernet Switches and a Central FCF Function Point. The Ethernet Links physically connect these various components.

FIG. 1d is another topology configuration example of an FCoE Network (with an FCF). It shows Host Systems and their connections to Storage Controllers through a single Ethernet Switch and a Central FCF Function Point. The Ethernet Links physically connect these various components.

FIG. 2 is an overview of a typical high level schematic for an FCoE Adapter known as a Converged Network Adapter (CNA). It shows how the 3 major components/functions (FC functions, FCoE Functions, and NIC Functions) fit together and interface to the system and to the External network. Also the ENode is indicated.

FIG. 3 is a more detailed schematic look at the various components that make up an FCoE Converged Network Adapter (CNA). The pair of entities known as the Link End point (FCoE_LEP) and the VN_Port is shown as is the ENode, and the ENode FCoE Controller.

FIG. 4 shows the layout of an FCoE Ethernet Frame which encapsulates a Fibre Channel Packet.

FIG. 5 shows the layout of a FIP (FCoE Initiation Protocol) Ethernet Frame which contains a FIP Operation Section that contains the Operation Code and SubCode, Length, Flags, as well as the Operation's Descriptor List.

FIG. 6 shows a Layout of the Operation Section of the VN_Port MAC Address Verification Solicitation FIP message. This layout includes the generated "Potential VN_Port MAC Address".

FIG. 7 shows a Layout of the Operation Section of the VN_Port MAC Address Conflict Response FIP Message.

FIG. 8 shows a Layout of the Operation Section of the Target VN_Port Advertisement FIP Message. And it shows the new "T" Flag.

DETAILED DESCRIPTION OF THE INVENTION

The purpose of this invention can be seen in the example configuration topology shown in FIG. 1a, where link 113 is to be used as a "Direct" path for the FCoE/FIP messages to travel from one of the Host Systems 100 to one of the Storage Controllers 112 through Ethernet Switches (A 103 & B 109). This "Direct" path is usually not available to FCoE implementations; however, this invention enables use of that path by FCoE and FIP frames. FIG. 1b is another example configuration where things are interconnected via the single Ethernet Switch (A) 156. In this example the Direct/Shortcut path is internal to the Ethernet Switch (A) 156.

In addition to the use of the Direct/Shortcut path between the CNAs, this invention eliminates the involvement of the FCF, thus making this more than just a shortcut for the ULP, but a complete Direct Mode Shortcut between the CNA peers as can be seen in FIG. 1a and FIG. 1b with CNAs Peers 101/111 and 151/158.

(Note: In this specification, there are functions that are shown as being performed in the CNA, ENode, VN_Port, etc., however, those should be considered as example implementations since there can be implementations of this invention in which these functions are performed in other locations including inboard (inside) the systems'/devices' Central Processing Units—(or their support chips) in Hardware, Microcode, or Software; or Outboard (on an adapter chip or card) in Hardware, Microcode, or Software; or any combination of inboard or outboard implementations).

Referring to FIG. 3—The term ENode/VN_Port will be used whenever the functions' placement is an implementation option which could either be accomplished by the ENode's FCoE Controller 303 (perhaps on behalf of the VN_Port) or by the VN_Port 305 and its FCoE_LEP 304. Also some of the various functions that are performed by one of the pair of components known as FCoE_LEP 304 and VN_Port 305 will be referred to (herein) as functions performed by the VN_Port or the ENode/VN_Port. And the function of the ENode FCoE Controller (303) will often be referred to as being performed by the ENode.

Main Process Steps

The most advantages embodiment of this invention is one that includes the following processes:

1. The CNAs 101/111 & 151/158 will perform the FCoE (FC-BB-5) discovery process which has the intention to determine if the configuration includes FCFs. If an FCF Advertisement response does occur, then the FC-BB-5 processes can proceed as is the case before this invention. The following steps are followed if the FCF discovery processes times-out without a FCF Advertisement response (or with configuration/administrative direction).

2. Each of the ENodes in the network 101/111 & 151/158 will create VN_Port MAC addresses that it intends to use when it instantiates (cause it to become operational) an FCoE_LEP 304 and VN_Port 305 pair (the pair will be called herein, just the VN_Ports). The MAC address will be created in a form known as FPMA. The Direct Mode FPMA is a 48 bit MAC address where the high order 24 bits are equal to the default or administratively determined FC-MAP (a set of bits defined by FC-BB-5 to represent the FCoE network) and (most of) the low order 24 bits are dynamically and randomly-generated or chosen by the ENode FCoE Controller 303. The low order 24 bits will also be known as the N_Port_1D of the VN_Port.

Since the N_Port_ID must be unique within the FCoE Network (as does the VN_Port MAC address), the ENode FCoE Controller 303 must insure that the generated N_Port_ID (and therefore its MAC address) is unique. There are a number of ways that can be used to ensure this uniqueness, including the technique described herein where the ENode tests this uniqueness by first creating the proposed VN_Port MAC address then preparing to receive messages from that MAC address, and then sending (multicasting)—the MAC address just created—in a FIP message (refer to FIG. 5 for the general format of a FIP message) called, herein, the "VN_Port MAC Address Verification Solicitation" FIP message (Refer to FIG. 6 for an example of the possible layout of the operation section of the FIP message and see the "New FIP Messages" section below).

After sending this Verification Solicitation, the ENode may wait for an implementation determined time period, and if no "VN_Port MAC Address Conflict Response FIP Message" is received (refer to FIG. 7 for an example of the possible layout of the Operation Section of the FIP message and see the "New FIP Messages" section below) then the generated MAC address (and the embedded N_Port_ID) can be assumed to be unique within the network. At that point, the ENode will record that MAC address as being one that may be used when it instantiates a VN_Port. If on the other hand, a "Conflict Response FIP Message" (FIG. 7) is received the MAC address must be discarded by the ENode, and it should disable its ability to receive messages for that MAC address. Then the ENode must again attempt to generate a unique MAC address/N_Port_ID etc. until uniqueness is obtained.

Then, at any time in the future if the ENode receives a "VN_Port MAC Address Verification Solicitation FIP Message" (FIG. 6), it must return to the sender a "VN_Port MAC Address Conflict Response FIP Message" (FIG. 7).

Note: In order to lessen the probability of conflict—when an ENode generates its own N_Port_ID and uses it in a VN_Port MAC address, the ENode should insure it is using an appropriate random number generator.

3. Each of the (for example: Initiator) CNA ENodes' FCoE Controllers 303 will request descriptive information by sending out FCoE Discovery Solicitation FIP Messages (refer to FC-BB-5) but instead of being addressed to Multicast address "All-FCF-MACs" as is the case with normal FC-BB-5, it will be sent to the Multicast address of (for example) "All-Target-MACs". ENodes (for example: Targets) which receive this solicitation should respond for each of its established or potential VN_Ports with a Unicast Advertisement FIP message back to the solicitating ENode (e.g. Initiator) with descriptive information. The Initiator ENodes will use the information to create a list of potential Targets and their MAC addresses from which it will make selections. This means that each of the Unicast Advertisement Response FIP Messages will contain one of the MAC addresses of an established or potential Target VN_Port. This Advertisement FIP Message should (in the preferred implementation) have the same general format of the FCoE FCF FIP Advertisement (refer to FC-BB-5 and FIG. 8 and see the "Modified FIP Message" section below).

This solicited Target Advertisement FIP message also needs to be padded out with zeros to the maximum FCoE/FIP message length. The receipt of this advertisement message by the Initiator will ensure that the path has enough capability to support the maximum FCoE/FIP message length. If the path is not capable of handling the maximum FCoE/FIP message the message will be dropped by an intervening Ethernet switch and the Initiator will not know about the Target VN_Port and will not send any subsequent messages to it.

4. The Initiator ENode will issue a Fabric Login (FLOGI) packed in a FCoE FIP Messages (per FC-BB-5) to selected Targets and the selected Targets should respond with the Fabric Login Accept (FLOGI ACC) packaged in a FCoE FIP Message (per FC-BB-5). When the Initiator receives the FLOGI ACC FIP Message, the Virtual Link is established, and the peer VN_Ports on each side of the Virtual Link can then establish the Logical (End-to-End) connection by exchanging FCoE PLOGI/PLOGI ACC, etc. messages and then continue to function as if they are in a FC Point-to-Point connection. (Note: Either Direct Mode enabled ENode VN_Port peers, on either side of the Virtual Link, may issue the (FCoE) PLOGI message or (FCoE) PLOGI ACC message as detailed in FC-LS-2-section 6.2.2.4.)

5. ULP messages (e.g. commands, data, responses, etc.) and other FCP messages will then be able to flow directly between the VN_Port Peers. When either side of the VN_Port to VN_Port Virtual link has an FCP message to send to the other side it may package it in an FCoE frame (See FIG. 4) and send it to the other via normal FCoE processes (but without the involvement of an FCF).

6. The ENode FCoE controller 303 (for example: the Target ENode FCoE Controller) will periodically advertise its VN_Ports by sending (Multicast) advertisements to (for example) "All-Initiator-MACS" starting from the time it discovers that it is operating in Direct Mode and has acquired its VN_Port MAC addresses. This will occur on a frequency equal to an FC-BB-5 specified value known as the FKA_ADV_Period (default=8 seconds). This process permits newly connected ENodes (for example Targets/Storage Controllers) 112 to let other ENodes (for example) Initiators 101 know that they are now available. This advertisement is also used as a Keep-Alive message which will ensure that Initiators (for example) can tell if the Virtual Link between the ENodes is still active.

7. All ENode FCoE controllers 303 (whether Initiator or Target) will periodically send (e.g. Multicast) Keep Alive (advertisement) FIP type Messages, on behalf of their established VN_Ports (if any), to peer VN_Ports. It is also possible for the period value to be set (e.g. by an administrator) to various values including zero meaning that this type of FCoE Keep Alive message should not be issued perhaps because this connection is a switchless connection.

8. End-To-End logical connections may be terminated via the normal FCoE (FC-BB-5) standardized processes and FIP messages (e.g. Fabric Logoff—LOGO and LOGO LS_ACC—Logoff Accept). And then no messages should be sent or accepted between those VN_Port Peers.

New FIP Messages

The following are examples of the advantageous embodiments of the New "Direct Mode Shortcut" related FIP messages.

There are 2 new FIP messages that are needed which are called (herein):
1. The "VN_Port MAC Address Verification Solicitation" FIP Message (Refer to the operation section shown in FIG. 6).
2. The "VN_Port MAC Address Conflict Response" FIP message (Refer to the operation section shown in FIG. 7).

These FIP messages are encapsulated in an Ethernet Frame as shown in FIG. 5. The Operation Section of these two new FIP messages, shown in the example layouts FIG. 6, and FIG. 7 are used to determine if a generated VN_Port MAC address is unique within the network.

1. The VN Port MAC Address Verification Solicitation FIP Message is (in this example) a FC-BB-5 compatible FIP type message form. (Refer to FIG. 5) This FIP Message contains the Operation Section shown in FIG. 6.

This operation section contains:
a. The FIP Discovery Operation Code 609 equal to 0001h and the SubCode 610 equal to 03h.
b. The Descriptor List length 608 equal to 2.
c. The MAC Address Descriptor 607 (Type=2 & Length=2) that contains the potential VN_Port MAC Address 603. This is the MAC address dynamically generated by an ENode as a potential VN_Port MAC address. Before a VN_Port can be instantiated it must have a MAC address that is unique within the network. In order to ensure that a MAC address which is generated for an VN_Port is unique, this message will be sent (multicast) to determine if there already exists a VN_Port with the same MAC address.
d. The Frame will be padded out 600 with zeros to reach the minimum Ethernet Frame length.
If there is a VN_Port with this MAC address, it is expected that the "VN_Port MAC Address Conflict Response" FIP Message will be returned.

2. The VN Port MAC Address Conflict Response FIP message is (in this example) a FC-BB-5 compatible FIP type message form. (Refer to FIG. 5) This FIP Message contains the Operation Section shown in FIG. 7.

This operation section contains:
a. The FIP Discovery Operation Code 709 equal to 0001h and the SubCode 710 equal to 04h.
b. The Descriptor List Length 708 equal to 2.
c. The MAC Address Descriptor 707 (Type=2 & Length=2) that contains the conflicting VN_Port MAC address 703. This is the MAC address that is a duplicate of a MAC address within the ENode issuing this message.
d. The Frame will be padded out 700 with zeros to reach the minimum Ethernet Frame length.

This message will be issued by an ENode FCoE Controller 303 if it receives a conflicting "VN_Port MAC Address Verification Solicitation" FIP Message (Refer to FIG. 6) since that would indicate the sending ENode has generated a duplicate VN_Port MAC address.

The ENode to which this message is sent is expected to disable its ability to receive the subject MAC address, and try again to generate a unique VN_Port MAC address.

Modified FIP Message

There is one existing FC-BB-5 FIP message that (as an example) has been re-tasked and modified slightly to include a possible new informational Flag, and some new uses for existing fields. That example FIP message is the Advertisement (and Keep Alive) FIP Message (refer to FIG. 8 for the Operation Section of this FIP message) which will be formatted as is specified by the FC-BB-5 standard but with a possible new Target flag (called the "T" Flag 804) that will be set in the currently reserved Flags area of the Operation Section of the FIP message.

(Note: the use of the word "Target" in the Drawings (and in the text below) is an example, since where ever the word Target is used, the word "Initiator" could also be used when the message is sent from the initiator.)

The Advertisement FIP Message contains a FIP Operation Code 809 equal to 0001h and a Sub Code 810 equal to 02h.

The MAC Address 811 will be the ENode (e.g. Target) VN Port MAC address.

The Name field 802 may contain the name of the device—for example: the Target (Storage Controller) Name (Target_Name).

The VF_ID field 807 may contain a default VF_ID.

The FC-MAP field 805 will contain the default or administratively set FC-MAP.

The Fabric_Name field 801 may contain a default fabric name.

The FKA_ADV_Period 803 will contain the default or administratively set value.

The frame will be padded out 800 to the maximum FCoE frame size if the "S" Flag 806 is set on (S bit=1) otherwise there will be no padding.

The other flags and fields will be the same as defined in the FC-BB-5 for an Advertisement FIP Message.

With this invention the Advertisement FIP Message may now be sent from not only the FCF per FC-BB-5, but also from the ENodes (for example: Targets). When the Advertisement FIP Message's new "T" Flag 804 is set on (T=1) it will indicate that the advertisement is sent from (for example) a Target instead of an FCF. The "F" Flag 808 (the FCF flag) should be set off (F=0). It is also possible that the fact that the "F" Flag is set off, is sufficient to indicate that the advertisement is not being sent from the FCF and is being sent from (for example) the Target; in that case no "T" Flag will be needed. Any layout and approach which is sufficient to indicate that this is an Advertisement Message from an ENode (such as a) Target and not an FCF should be consistent with this invention.

The Advertisement FIP messages from an ENode (for example the Target) should also contain the ENode's (e.g. Target's) actual or potential VN_Port MAC Addresses 811 and perhaps a Name of the Target (Storage Controller) 802.

This is useful since there may be a number of different Targets (Storage Controllers) each of which have a number of ENodes, and the Initiators may want to chose which Targets they connect to and the number of connections to each. The FC_MAP 805 value (which should be set to the default or administratively set value) is carried here for compatibility reasons.

Other Considerations

In the above descriptions of all the various FIP messages it should be understood that they are only examples of layouts and Ethertypes that would be appropriate for this invention. The various new Flag bits could be located in other parts of the message and the messages would still be acceptable for this invention. This means there are other layouts and Ethertype for the new and modified messages which will be equally useful to this invention which should be considered alternatives message layouts; the FIP message examples shown are only one set of the possible embodiments and layouts that may be used as part of this invention.

Likewise it is also possible to change the FIP message code or subcode; and even with a change in the layout within a FIP message, it may still be acceptable for this invention. In fact that would include using a new FIP code or subcode to identify an appropriate FIP message instead of a Flag bit. Or using a Flag bit on a current FIP message to denote its new function. Even if a different layout is used with a new code (609, 709, 809) or subcode (610, 710, 810), if it contains the needed essential information such that the above functions can be accomplished, that should be acceptable for this invention.

In the modified FIP message, many parts of the Descriptor Lists have little value except for their compatibility with an existing FIP Message; so an alternate Descriptor List, which still contains the needed information, should be considered an acceptable alternative layout for this invention.

It should also be understood that instead of the Multicast addresses of "ALL-Target-MACs" or "ALL-Initiator-MACs" it is possible to Multicast using the currently FC-BB-5 defined "All-ENode-MACs" or "All-FCF-MACs", or "All-FCoE-MACs" and set a flag or value that indicates who should handle or ignore the message. Likewise there could also be yet another set of Multicast values that could also cause selectivity perhaps with or without a Flag or other value. These possible variations should be considered compatible with this invention.

Throughout this invention specification the term Initiator should be read to mean—a device that has initiator functions whether or not it is within a computer host system. Likewise, the term Target should be read to mean a Storage System or Storage Controller or a device that emulates the network interactions that are expected with a Storage System or Storage Controller.

What is claimed is:

1. A system for establishing a virtual link for transferring Fibre Channel (FC) messages over a switched Ethernet network, comprising:

at least three system network adapters; and each of the at least three system network adapters configured to store a plurality of instructions executable by each of the at least three network adapters, the instructions including instructions for:

soliciting directly from a plurality of the at least three system network adapters for their descriptive information, including their VN_Port media access control (MAC) addresses via a solicitation message, the solicitation message formatted as an FCoE Initiation Protocol (FIP) type message and said message neither passing through nor utilizing any FCoE Forwarder (FCF), FC switch or any FCF type device, and said at least three system network adapters not being FCF type devices;

obtaining VN_Port network unique media access control (MAC) addresses directly from each of the plurality of system network adapters;

sending an FC over Ethernet (FCoE) fabric login request (FLOG I), within an FCoE Initiation Protocol (FIP) message, from an initiator system network adapter directly to a selected target system network adapter without passing through or utilizing any FCoE Forwarder (FCF), FC Switch or FCF type device; and forming a direct virtual link between the initiator system network adapter and the selected target system network adapter, after the selected target system network adapter has accepted said FCoE fabric login request by responding with an FCoE fabric login accept (FLOGI ACC)—within an FCoE Initiation Protocol (FIP) message sent directly from the selected target system network adapter to the initiator system network adapter without passing through or utilizing any FCoE Forwarder (FCF), FC switch or FCF device.

2. The system of claim 1, wherein the system network adapters, initiator system network adapter, and target system network adapter each comprises a converged network adapter (CNA).

3. The system of claim 1, wherein the system network adapters can be at least one of an initiator system network adapter or a target system network adapter and wherein said initiator system network adapter comprises a network adapter for a computer and said target system network adapter comprises a network adapter for storage systems or storage controllers.

* * * * *